United States Patent [19]
Hashida et al.

[11] Patent Number: 5,399,451
[45] Date of Patent: Mar. 21, 1995

[54] OPTICAL RECORDING MEDIUM AND METHOD FOR USING THE SAME

[75] Inventors: Takashi Hashida, Osaka; Yoshio Kishimoto, Hirakata, both of Japan

[73] Assignee: Matsushita Electric Industrial Co., Ltd., Kadoma, Japan

[21] Appl. No.: 45,541

[22] Filed: Apr. 9, 1993

Related U.S. Application Data

[63] Continuation-in-part of Ser. No. 849,606, Mar. 12, 1992, abandoned.

[30] Foreign Application Priority Data

Mar. 14, 1991 [JP] Japan ................... 3-049544

[51] Int. Cl.$^6$ ................... G11B 7/24; G11B 7/00
[52] U.S. Cl. ................... 430/19; 430/139; 430/945; 430/495; 430/962; 430/345; 369/288
[58] Field of Search ............ 430/19, 139, 945, 495, 430/962, 343, 345, 333; 346/135.1; 369/288; 365/111

[56] References Cited

U.S. PATENT DOCUMENTS

| | | | |
|---|---|---|---|
| 3,418,470 | 12/1968 | Birkeland | 430/139 |
| 3,683,336 | 8/1972 | Brownlee et al. | 430/332 |
| 3,843,382 | 10/1974 | Zweig | 430/139 |
| 4,711,832 | 12/1987 | Gruenbaum et al. | 430/106 |
| 4,737,427 | 4/1988 | Miyazaki et al. | 430/19 |
| 4,845,021 | 7/1989 | Miyazaki et al. | 430/495 |
| 4,927,681 | 5/1990 | Chikuma | 428/64 |
| 5,079,061 | 1/1992 | Hashida et al. | 428/64 |
| 5,088,086 | 2/1992 | Van et al. | 369/100 |
| 5,134,605 | 7/1992 | Goldberg et al. | 369/101 |
| 5,268,862 | 12/1993 | Rentzepis | 365/151 |

FOREIGN PATENT DOCUMENTS

| | | | |
|---|---|---|---|
| 193931 | 9/1986 | European Pat. Off. | |
| 248176 | 12/1987 | European Pat. Off. | |
| 354070 | 2/1990 | European Pat. Off. | |
| 227813 | 9/1985 | Germany | 430/139 |
| 60-149087 | 8/1985 | Japan | |
| 60-159087 | 8/1985 | Japan | |
| 63-306090 | 12/1988 | Japan | 430/495 |
| 64-9281 | 1/1989 | Japan | |
| 1259353 | 10/1989 | Japan | 430/345 |
| 3065944 | 3/1991 | Japan | 430/495 |
| 3284743 | 12/1991 | Japan | 430/345 |
| 4-146989 | 5/1992 | Japan | |

OTHER PUBLICATIONS

W. J. Tomlinson,: "Analyses of bit-oriented optical memories using photochromic media", Applied Optics, vol. 23 No. 22, Nov./1984, pp. 3990–3993.

INPADOC Patent family report for JP 3-284743 published Dec./1991.

Primary Examiner—Charles L. Bowers, Jr.
Assistant Examiner—John A. McPherson
Attorney, Agent, or Firm—Cushman, Darby & Cushman

[57] ABSTRACT

An optical recording medium contains a fluorescent material and a photo-reactive bistable quencher. Information is digitally recorded by utilizing the bistable isomers of the photo-reactive bistable quencher by irradiating the medium with a light in the wavelength to be absorbed by the fluorescent material, whereby energy is transferred from the fluorescent material to the photo-reactive bistable quencher. Reading is made by irradiating the medium with a weaker light and detecting the fluorescence emitted by the fluorescent material.

4 Claims, 2 Drawing Sheets

OPTICAL RECORDING MEDIUM AND METHOD FOR USING THE SAME

This application is a Continuation-In-Part of our application No. 07/849,606, filed Mar. 12, 1992, which is now abandoned in favor of continuation application No. 08/048,936, now abandoned.

FIELD OF THE INVENTION AND RELATED ART STATEMENT

1. BACKGROUND OF THE INVENTION

The present invention relates to an optical recording media capable of being rewritten, and methods for recording information, reading and erasing the recorded information on said recording media, or method for initializing said recording media.

2. PRIOR ART

In the past, photochromic compound is known as a material which produces a reversible color change upon irradiation of two kinds of light emitted from two light sources whose wavelengths are different from each other. In that case of utilizing the photochromic compound as an optical recording material in the recording medium, it is a general practice to record information by irradiating a recording layer including a colored isomer of said photochromic compound at an absorption wavelength of said colored isomer with a visible laser irradiation. Thereby, the colored isomer is converted into its colorless isomer, and to erase the information by irradiating said recording layer with an ultraviolet laser irradiation, thereby returning the colorless isomer to the colored isomer. The reading of the recorded information is performed by irradiating the recording layer with a visible laser of a light intensity weaker than that at the recording process, thereby detecting the absorption by said colored isomer.

Incidentally, according to the above-mentioned conventional method of recording information by irradiating the recording medium composed of the photochromic compound with a visible laser beam capable of being absorbed by the colored isomer of the photochromic compound, a large quantity of energy is required for the recording. The large energy consumption is attributable to low efficiency in the photochromic reaction for converting the colored isomer into the colorless isomer. As a result of the large energy consumption, there has been a problem of the requirement for a light source of a large energy output and an undesirably long recording period.

In addition to this, there has been another problem in that the increase in the recording density is difficult. Although there has been proposed a method for increasing the recording density of the rewritable optical recording medium, wherein a photochromic compound capable of forming a J-aggregate having a sharper absorption peak (band range) than the photochromic compound itself in the recording layer, there has been only scarce number of photochromic compounds which form stable J-aggregates available for configuring the optical recording medium, and thus it has been difficult to prepare a multi-frequency recording medium of a high multiplicity by employing such photochromic compounds.

Further, there has been a still other problem that the cyclic service-life for the repeated recording and erasing is not sufficiently long. The short service-life is attributable to the fact that the deterioration reaction of the photochromic compounds proceeds as a side reaction of the photochromic reaction at the time of the recording and erasing.

Moreover, there has been a still further problem that the recorded state of the recording medium may sometimes be destroyed by the reading operation itself. This is attributable to the change in the recorded state by a weak light which should be irradiated for the reading. Even in an optical recording medium of postscript-type which employs an organic dye (coloring matter) which does not demonstrates a photochromic reaction, a denaturing of such dye compound proceeds little by little by being irradiated with a light at the time of the reading of recorded information, and the recorded information of the recording medium is finally lost. In order to suppress the denaturing, a means has been proposed as disclosed in the Japanese Unexamined Patent Publication No. 159087 (Tokkaisho 60-159087), wherein a quencher is added in the recording medium composition for quenching an excited species formed by irradiation with the reading light and for thus killing the cause of the deterioration.

OBJECT AND SUMMARY OF THE INVENTION

It is therefore the primary object of the present invention to provide an optical recording medium which requires only small recording energy and to provide a novel method for recording, erasing or reading information using the newly provided optical recording medium.

The optical recording medium has a high recording density and provides a novel method for recording, erasing or reading information using the newly provided optical recording medium. The optical recording medium further can undergone a multiplicity of repeated recording and erasing of the recorded information.

According to the present invention there is provided a novel optical recording medium comprising; at least one recording layer composed essentially of a composition which includes at least one dye and at least one photochromic compound capable of quenching the fluorescence emitted from said dye.

The present invention is characterized by utilizing a very high light sensitivity of the combination of the dye and the quencher, and intended to realize a reduction in the recording energy, an improvement in the recording density, and an improvement in the repetition stability in the recording and erasing process.

On the optical recording medium of the present invention, an information is digitally recorded by utilizing the two bistable isomers of the photochromic compound. In the erased state, the absorption band of the photochromic compound is in its long wavelength side (being a colored isomer), while, in the recorded state, the absorption band is in its short wavelength side (being a colorless isomer).

Namely, the information is recorded by causing the dye to absorb the irradiated light and to transfer the absorbed energy to the photochromic compound, whereby causing the photochromic compound to participate in an isomerization reaction (colored isomer→ colorless isomer) on this recording medium. Since the present invention utilizes the fact that the combination of the dye and the photochromic compound have a very high light sensitivity, the recording energy is reduced accordingly, in the above-stated recording mode.

The reading of the recorded information is performed either by detecting the fluorescence emitted from the dye or by detecting the fluorescence emitted from the photochromic compound having a fluorescent activity. By this reading mode, an precision in the reading is much improved.

Further, the erasing of the recorded information is performed by isomerizing (colorless isomer→colored isomer) only small portion of the photochromic compound which is included in the recording layer in an excessive amount, thereby activating the photochromic compound to serve as a quencher. In this manner, only the small portion of the photochromic compound is caused to participate in the erasing of the recorded information, whereby the number of cyclic repetition of recording/erasing is much improved.

In some of the optical recording media built in accordance with the present invention, plural dyes, each being capable of forming a J-aggregate and having an absorption wavelength different from that of the other, are used to form a plurality of multi-frequency recording layers laminated one another. The obtained multi-frequency optical recording medium has an advantage in its high recording density.

The degree of deterioration in the recorded state of the recording layer of the optical recording medium at the time of the reading is sufficiently small.

Some of the optical recording media built in accordance with the present invention comprises, at least one recording layer containing as essential material a composition which includes,
- at least a photochromic compound with fluorescent activity, which is a first photochromic compound, and
- at least one photo-reactive bistable quencher, which is a second photochromic compound, and which quenches the fluorescence emitted from said first photochromic compound,
- said one photo-reactive bistable quencher being a control agent for controlling the photochromic reactivity of said first photochromic compound.

The photo-reactive bistable quencher of the present invention produces two isomers, one having an absorption band which is different from that of the other, and one being convertible into the other by an irradiation with a light. One of these bistable isomer acts as a quencher for quenching the fluorescence emitted by the first photochromic compound. Thus it is safely said that the photo-reactive bistable quencher is a particular photochromic compound having a quenching activity.

The obtained optical recording medium has an advantage in suppressed destruction of the recorded state at every reading step, thereby greatly increasing the number of repeated reading processes. The details thereof will be elucidated in the forthcoming description with reference to the preferred embodiment.

While the novel features of the invention are set fourth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

OPTICAL RECORDING MEDIUM COMPRISING A FLUORESCENT MATERIAL

Figure 1:
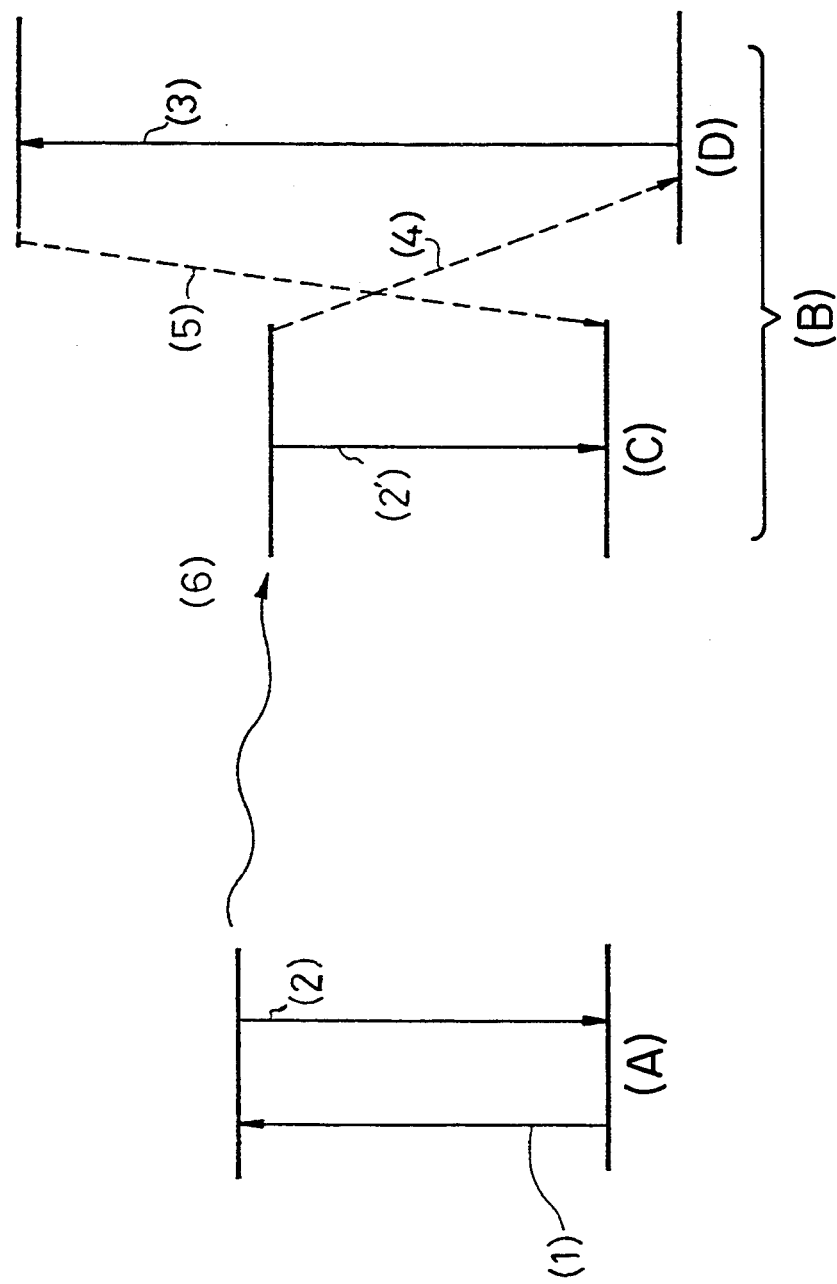
FIG. 1 is a schematic energy level diagram showing a mechanism of recording, erasing and reading information of the recording medium prepared in accordance with the present invention, comprising a recording layer composed of a composition which includes a dye and a photochromic compound. ((1) represents the excitation resulting from absorption of light for recording/reading; (2) represents relaxation with fluorescence detected at reading step; (2') represents relaxation with fluorescence detected at reading step; (3) represents excitation resulting from absorption of light for erasing; (4) represents photochromic reaction; (5) represents photochromic reaction; (6) represents energy transfer; (A) represents dye; (B) represents photochromic compound; (C) represents colored isomer (erased state); and (D) represents colorless isomer (recorded state))

A preferred embodiment of the optical recording medium comprising a recording layer composed essentially of a composition-which includes a dye and a photochromic compound built in accordance with the present invention will now be elucidated with reference to FIG. 1. In FIG. 1, each of the three pairs of the top and bottom thick solid lines represents the excited state energy levels (top) and the ground state energy levels (bottom) of the dye and the photochromic compound, respectively.

The upward arrows from the ground states to the excited states represent excitations induced by an energy absorption at the time of being irradiated with lights, and the downward arrows from the excited state to the ground states represent relaxations at the time of emitting fluorescence. The waved arrow (indicated by (6) in FIG. 1) from the excited state of the dye to the excited state of the colored isomer of the photochromic compound represents an energy transfer from the dye to the photochromic compound.

Further, the broken line arrows crossing in a space between the colored isomer and the colorless isomer of the photochromic compound represent the corresponding isomerization reactions between the isomers. In the case of the erasing mode, the photochromic compound is in its colored isomer and its absorption band overlaps with the fluorescence band of the dye. For this reason, the energy transfer from the dye to the quencher occurs efficiently, whereby the fluorescence emitted from the dye is quenched. Therefore, the erased state equals to a state wherein the photochromic compound is activated as a quencher.

On the contrary, in the recorded state, the quencher is in its colorless isomer and has no absorption band in the vicinity of the fluorescence band of the dye. Therefore, no energy transfer from the dye to the photochromic compound occurs, and no quenching of the fluorescence emitted from the dye proceeds. As a result, the dye directly emits fluorescence. In this manner, the photochromic compound is in its colorless isomer in the recorded state, and thus it is safely said that the quencher is in its deactivated state in that mode.

<Recording Mode>

The recording of information is performed by irradiating the recording layer-of the recording medium with a light beam including at least a component of wavelength in the region of the absorption band of the dye (indicated by (1) in FIG. 1). At that time, the excitation energy of the dye which has absorbed the light beam to be activated is transferred to the photochromic compound (colored isomer) (indicated by (6) in FIG. 1).

By this energy transfer, the colored isomer of the photochromic compound which has been excited undergoes a reaction (isomerization reaction, indicated by (4) in FIG. 1) for converting itself from its colored isomer into its colorless isomer and loses its activity as a quencher. If the number of the molecules of the dye is larger than those of the photochromic compound, an excitation energy of the larger number molecules of the dye transfers collectively to the smaller number molecules of the photochromic compound in the recording step.

In this manner, a larger quantity of the energy is given in this state than those cases wherein the photochromic compound is excited by directly absorbing the light beam, and a probability of causing the isomerization reaction (indicated by (4) in FIG. 1; the reaction representing the recording process) is increased. As a result, the isomerization reaction in the photochromic compound from its colored isomer to its colorless isomer is promoted and the recording energy is eventually reduced. Therefore, it is advantageous to increase a proportion of the content of the dye, which is capable of absorbing the light beam required for the recording and serving as a donor for supplying the excitation energy to that of the photochromic compound in the composition.

<Reading Mode>

The reading of the recorded information is performed by detecting the fluorescence (indicated by (2) in FIG. 1) emitted from the dye in response to the irradiation with a light beam of a weaker intensity (indicated by (1) in FIG. 1) in the wavelength region capable of being absorbed by the dye, whereby the reading in a preferable sensitivity is achieved. The reason for this achievement of good sensitivity is that: in addition to the fact that the detection by fluorescence is inherently excellent in its sensitivity, the isomerization of only one molecule of the photochromic compound may invite a change in the fluorescence by the large numbers of the molecules of the dye, and thus an amplification in the detection is realized.

In this reading mode, if the wavelength of the light beam irradiated for the reading (represented by (1) in FIG. 1) is near the wavelength of the fluorescence band to be detected (represented by (2) in FIG. 1), the effect of scattering for the reading unfavorably increases; and thus the precision in the reading may sometimes be decreased, inducing the increase of noises. In this case of the lowered precision, a fluorescent photochromic compound should be employed, and the fluorescence beam ((2') of FIG. 1) emitted from the photochromic compound in response to the same light beam ((1) of FIG. 1) for the reading should be detected.

In this manner, the wavelength difference between the reading light beam and the fluorescence beam becomes large, and the noise attributable to the scattering of the reading light beam decreases, whereby a favorable reading process is achievable. The effect of this reading mode becomes remarkable in particular at the time where the dye forms a J-aggregate, and the wavelength difference between its absorption band and its fluorescence band (Stokes shift) becomes small as compared with a normal difference.

In the reading method according to the present invention wherein the fluorescence emitted from the dye (represented by (2) in FIG. 1) is detected for the reading the recorded information, the intensity of the fluorescence is high at the recorded spot and is low at the non-recorded (or erased) spot. On the other hand, in the case of detecting the fluorescence emitted from the photochromic compound having a fluorescent activity (represented by (2') in FIG. 1), the intensity of the fluorescence is high at the non-recorded (or erased) spot. This is attributable to the fact that the photochromic compound at the non-recorded spot is in its colored isomer, whereby the fluorescence of the dye ((2) of FIG. 1) is quenched by the transfer of the excitation energy ((6) of FIG. 1) but another fluorescence ((2') of FIG. 1) is emitted from the photochromic compound.

On the other hand, since the photochromic compound is in its colorless isomer at the recorded spot, no energy transfer occurs and the dye directly emits the fluorescence (represented by (2) in FIG. 1), whereby the intensity of the fluorescence by the photochromic compound is weakened, accordingly.

<Multi-frequency Optical Recording Medium>

In order to perform a recording operation in a higher density, another embodiment of the optical recording medium is configured. This recording medium comprises; a plurality of laminated recording layers, each composed essentially of a composition including a dye having a sharp absorption and a photochromic compound, wherein absorption wavelengths of the dyes in the respective recording layers are different from one another. By irradiating the recording medium with lights of the different wavelengths which can selectively be absorbed by each of the dyes, a multiple-recording is made possible.

OPTICAL RECORDING MEDIUM COMPRISING A FLUORESCENT MATERIAL WHICH FORMS A J-AGGREGATE

By employing a J-aggregated dye having an absorption band of a narrow half-value width and thus causing the recording medium to absorb the lights for every layers, it becomes made possible to perform a multiple-recording having a higher wavelength selectivity. In the case of the present invention wherein the recording wavelength is determined by the absorption band of the dye, the photochromic compound needs not form the J-aggregate as opposed to the conventional one disclosed in the U.S. Pat. No. 4,737,427. Thus, the multi-frequency recording becomes possible by employing a photochromic compound which does not form J-aggregate as the photochromic compound, whereby the provision of a rewritable high density optical recording medium is made easy.

The utilization of the dye capable of forming a J-aggregate in the recording layer composition has thus another advantage in reducing the energy required for the recording, because the efficiency in the energy transfer in the J-aggregate is high. The recording/reading can be performed in the afore-mentioned manner.

OPTICAL RECORDING MEDIUM COMPRISING THE PHOTOCHROMIC COMPOUND IN EXCESSIVE AMOUNT

Further, in order to overcome the disadvantage of the conventional optical recording media that the number of possible cyclic repetition of the recording and erasing is not sufficiently large, the recording layer of the present invention should be configured to include a photochromic compound in a quantity exceeding the amount of the photochromic compound actually required for quenching the fluorescence.

In this case, instead of activating major portion of the whole photochromic compound by irradiating with a large quantity of the ultraviolet irradiation in the erasing step, only a minute portion of the photochromic compound may be converted ((5) of FIG. 1) into its colored isomer by irradiating it with a small quantity of the ultraviolet irradiation ((3) of FIG. 1) (In FIG. 1, the arrow (5) indicates an photochromic reaction for activating as the quencher).

Actually, since the fluorescence emitted from the dye can be quenched by a minute amount of the quencher, it is sufficient to activate only a small portion of the photochromic compound as the quencher for quenching. By preliminarily including an excess amount of the photochromic compound in the recording medium as the quencher, even when the deterioration had proceeded in portion to the photochromic compound the remaining portion of the photochromic compound (which had not been deteriorated) acts as the quencher. In this manner, the number of cyclic repetition of the recording/erasing can be increased. Further, as mentioned above, since the activation of only a minute quantity of the total amount of the photochromic compound included in the recording medium is sufficient for the erasing step, this manner of erasing is also effective for the reduction in the energy to be consumed for the erasing (ultraviolet irradiation energy: indicated by (3) in FIG. 1). The recording and reading of the information can be performed in the already disclosed manner.

OPTICAL RECORDING MEDIUM COMPRISING A PHOTOCHROMIC COMPOUND

In the following paragraphs, description will be made on the configuration of another novel optical recording medium proposed for solving such problem that the recorded state of the recording layer may be destroyed at the time of reading of the recorded information. On the optical recording medium comprising the recording layer composed essentially of the composition which includes the photochromic compound (, which is the first photochromic compound,) and the photo-reactive bistable quencher (, which is the second photochromic compound,), a digital recording is performed by utilizing two bistable isomers (colored isomer and colorless isomer) of the photochromic compound (, which is the first photochromic compound,). The photochromic compound (, which is the first photochromic compound,) in its colored isomer corresponds to the erased state of the recording layer, while that in its colorless isomer corresponds to the recorded state of the recording layer.

Figure 2:
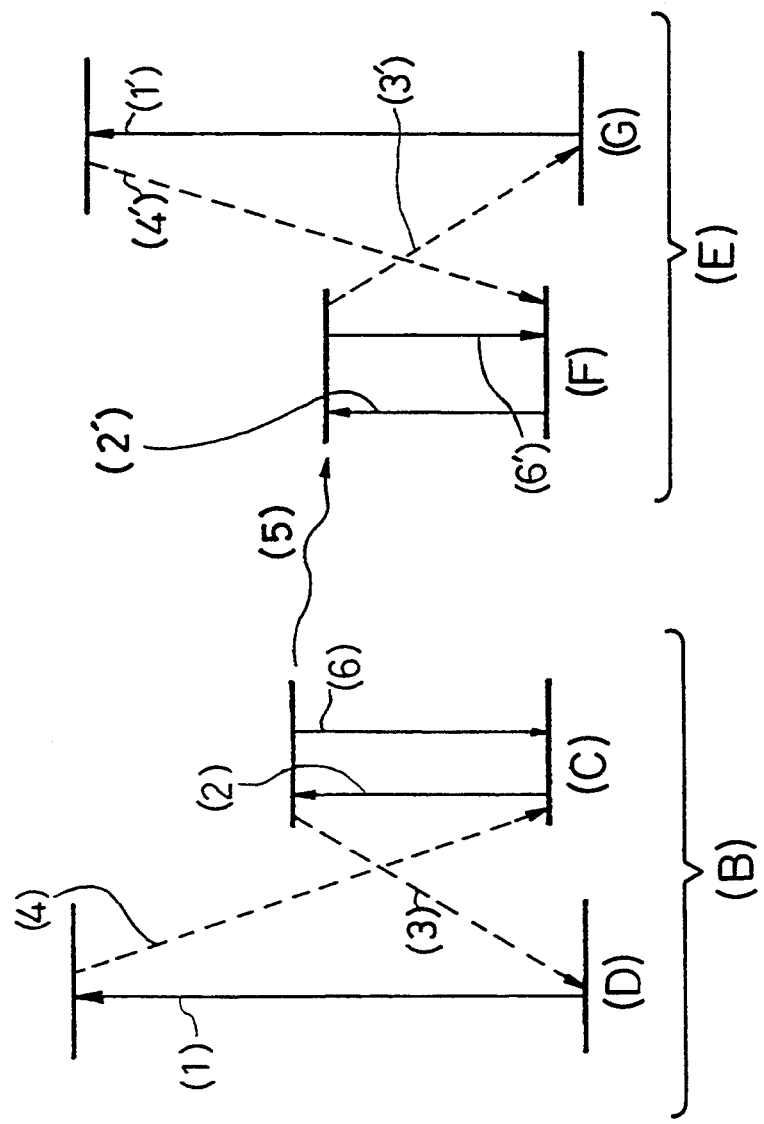
FIG. 2 is a schematic energy level diagram showing a mechanism of recording, erasing and reading information on the recording medium prepared in accordance with the present invention, comprising a recording layer composed of a composition including a photochromic compound (, which is a first photochromic compound,) and a photo-reactive bistable quencher (, which is a second photochromic compound.) ((1) represents excitation resulting from absorption of light for erasing; (2) represents excitation resulting from absorption of light for recording/reading; (2') represents excitation resulting from absorption of light for recording; (3) represents photochromic reaction; (3') represents isomerization reaction; (4) represents photochromic reaction; (4') represents isomerization reaction; (5) represents energy transfer; (6) represents relaxation with fluorescence, as does (6'); (B) represents the photochromic compound while (D) and (C) represent the colorless isomer (recorded state) and the colored isomer (erased state), respectively; (E) represents photo-reactive bistable quencher, while (F) and (G) represent long wave length isomer and short wave length isomer, respectively.)

On the other hand, the photo-reactive bistable quencher (, which is the second photochromic compound,) included in the recording layer plays a role of adjusting the presence/absence of the quenching activity and thus controls the photochromic reaction (a reaction corresponding to the recording process indicated by (3) in FIG. 2) of the photochromic compound (, which is the first photochromic compound.). Any quencher in the conventional postscript-type optical recording media holds a constant quenching activity. In contrast thereto, the quencher of the present invention prevents the destruction of the recorded information by suppressing the photochromic reaction (a reaction corresponding to, or for the recording process indicated by (3) in FIG. 2) by the quenching activity demonstrated only in the reading-out mode; while in the recording mode the quencher does not demonstrate the quenching activity, and causes the photochromic reaction (the reaction corresponding to the recording process indicated by (3) in FIG. 2) to proceed.

Hereinafter, a preferred embodiment of the optical recording medium comprising a recording layer composed essentially of a composition, which includes a fluorescent photochromic compound having a fluorescent activity (, which is a first photochromic compound,) and a photo-reactive bistable quencher (, which is a second photochromic compound,) built in accordance with the present invention, will be elucidated with reference to FIG. 2. In FIG. 2, each of the four pairs of the top and bottom thick solid lines represents the excited state energy levels (top) and the ground state energy levels (bottom) of the photochromic compound (, which is the first photochromic compound,) and the photo-reactive bistable quencher (, which is the second photochromic compound,), respectively.

The upward arrows ((1), (2), (1') and (2') of FIG. 2) from the ground states to the excited states represent excitations resulting from the absorptions of the irradiated lights. The waved arrow ((5) of FIG. 2) from the excited state of the photochromic compound (, which is the first photochromic compound,) to the excited state of the long wavelength isomer of the photo-reactive bistable quencher (which is the second photochromic compound,) represents the corresponding energy transfer. The downward arrows ((6), (6') of FIG. 2) from the excited states to the ground states represent the corresponding relaxation with fluorescence.

Further, the broken line arrows ((3) and (4) of FIG. 2) crossing at a space between the colored isomer and the colorless isomer of the photochromic compound (, which is the first photochromic compound,) represent the corresponding photochromic reaction between the isomers. In the same manner, the broken line arrows (indicated by (3') and (4') in FIG. 2) crossing at a space between the two isomers of the photo-reactive bistable quencher (, which is the second photochromic compound,) represent the corresponding isomerization reactions between the isomers.

It is preferable for the recording medium of the present invention that there is no energy transfer except for the illustrated one (5) of FIG. 2. Therefore, the overlap between the fluorescent band and the corresponding absorption band should be small. In order to fulfill this requirement, it is sufficient to select any of the overlap between any of the fluorescence band and any of the absorption band to be small; only exception being for the large wavelength overlap between the absorption band of the long wavelength isomer of the photo-reactive bistable quencher (, which is the second photochromic compound,) and the fluorescence band of the colored isomer of the photochromic compound (, which is the first photochromic compound,).

In the following paragraphs, concrete methods for erasing, recording and reading information on the recording medium of the present invention will be elucidated.

<Erasing/Initializing Mode>

At the erasing or initializing step, the photo-reactive bistable quencher (, which is the second photochromic compound,) is activated as a quencher first by irradiating it with a light ((1') in FIG. 2) to cause the quencher to participate in an isomerization reaction ((4') in FIG. 2) and to convert the quencher into its long wavelength isomer. Thereafter, the erasing or initializing operation of the recording medium is performed by irradiating the photochromic compound (, which is the first photochromic compound,) with a light (indicated by (1) in FIG. 2) for converting the compound into the colored isomer (indicated by (4) in FIG. 2).

It is to be noted here that conversion of the photochromic compound (, which is the first photochromic compound,) into the colored isomer is made not to the last molecule of the whole photochromic compound (, which is the first photochromic compound,), but only to such extent as to produce a mixture of the colored isomer and colorless isomer during the ultraviolet irradiation (indicated by (1) in FIG. 2). The reason for this is that: another photochromic reaction (indicated by (3) in FIG. 2) also takes place wherein the colored isomer which had been formed from the colorless isomer by the ultraviolet irradiation returns to the colorless isomer by absorbing the same ultraviolet irradiation. And the proportion of the colored and colorless isomers formed in the photochromic compound (, which is the first photochromic compound,) is determined by the rates of these two reactions.

If the erasing method in accordance with the present invention is employed, owing to the activation of the photo-reactive bistable quencher (, which is the second photochromic compound,) by the light irradiation ((1') of FIG. 2) the energy transfer ((5) of FIG. 2) from the excited state of the colored isomer to the photo-reactive bistable quencher proceeds. And the excited state of the colored isomer is quenched, thereby effectively suppressing the photochromic reaction (indicated by (3) in FIG. 2) attributable to the excited state of the colored isomer.

Therefore, in the above-mentioned situation, the photochromic reaction leading to the colored isomer (indicated by (4) in FIG. 2) becomes overwhelmingly predominant, between both the photochromic reactions induced by the ultraviolet irradiation (indicated by (1) in FIG. 2). As a result, the density of the colored isomer formed at the erasing step increases, and the absorption of the non-recorded spot increases, whereby the difference in the amounts of the transmitted lights through the recording layer is increased between the recorded spot and the non-recorded spot, accordingly. This brings a favorable precision to the process in the reading mode.

<Recording Mode>

In the recording operation, the photo-reactive bistable quencher (, which is the second photochromic compound,) is first irradiated with a light ((2') of FIG. 2) to deactivate as a quencher, by causing it to participate in the isomerization reaction (indicated by (3') in FIG. 2) for converting itself into its short wavelength isomer. The recording operation is achieved by thereafter irradiating the photochromic compound (, which is the first photochromic compound,) with a visible light (indicated by (2) in FIG. 2) to cause it to participate in the photochromic reaction (indicated by (3) in FIG. 2) for converting itself into its colorless isomer. At this time, the photo-reactive bistable quencher (, which is the second photochromic compound,) is in its deactivated state, and hence the energy transfer (indicated by (5) in FIG. 2) from the excited state of the colored isomer to the photo-reactive bistable quencher does not proceeds, and no quenching takes place. As a result, the photochromic reaction (indicated by (3) in FIG. 2) from the excited state of the colored isomer is not suppressed but proceeds efficiently for the recording.

<Reading Mode>

In the reading operation, the photochromic compound (, which is the first photochromic compound,) is irradiated with a visible light (indicated by (2) in FIG. 2), and the recorded information is read by detecting the light transmitted through the photochromic compound (, which is the first photochromic compound,). Incidentally, a reading in general is an operation of reading-out the difference in the light intensities between the recorded spot and the non-recorded spot. The unsolved problem of the destruction of the recorded information is due to the fact that an undesirable recording is made on the non-recorded spot by irradiation on it with a light for the reading, whereby the discrimination between the recorded spot and the non-recorded spot is made impossible.

In the reading operation in accordance with the present invention, the photo-reactive bistable quencher (, which is the second photochromic compound,) has previously been activated as a quencher at the non-recorded spot by the light irradiation at the initialization step (indicated by (1') in FIG. 2). Therefore the energy transfer (indicated by (5) in FIG. 2) from the excited state of the colored isomer produced by the light irradiation for the reading step (indicated by (2) in FIG. 2) to the photo-reactive bistable quencher (, which is the second photochromic compound,) proceeds, whereby the excited state of the colored isomer is quenched.

Therefore, any photochromic reaction (indicated by (3) in FIG. 2) corresponding to the recording process by the light irradiation (indicated by (2) in FIG. 2) does not proceeds, whereby any deterioration at the reading step, i.e., the destruction of the recorded information at the reading step (the recording on the non-recorded spot by the light for reading), does not take place.

Further, at the recorded spot, the isomerization reaction (indicated by (3') in FIG. 2) takes place in the photo-reactive bistable quencher (, which is the second photochromic compound,) to convert it into its short wavelength isomer by the light irradiation (indicated by (2') in FIG. 2) at the recording step, whereby the quencher (, which is the second photochromic compound,) is deactivated as a quencher. For this reason, the energy transfer (indicated by (5) in FIG. 2) from the excited state of the colored isomer produced by the light irradiation (indicated by (2) in FIG. 2) for the reading step to the photo-reactive bistable quencher (, which is the second photochromic compound,) does not proceed.

Therefore, the photochromic reaction (indicated by (3) in FIG. 2) corresponding to the recording process proceeds little by little. The proceeding of the reaction corresponding to the recording process however means that the difference between the recorded spot and the non-recorded spot becomes large. And this results in a favorable effect that the discrimination between the recorded spot and the non-recorded spot becomes easier with the increase in the number of the repetition of the reading, whereby another preferable advantage in the increased reliability is realized in the reading step.

<Materials for the Invention>

The dye which can be employed for embodying the present invention is exemplified as cyanines and merocyanines, but the present invention should not of course be limited only to the use of these two kinds of the dyes (coloring matters). The other dyes such as squaryliums and pyriliums may also be employed for embodying the present invention.

The photoreactive bistable quencher may be exemplified as compounds of thioindigos, azobenzenes, stilbenes, viologens, azines, dithizones, formazanes and salicylideneanilines in addition to the spiropylanes and fulgides, described in the claims.

The photochromic compound may be exemplified as compounds of thioindigos, azobenzens, stilbenes, viologens, azines, dithizones, formazanes and salicylidene anilines in addition to the spiropylanes and fulgides, described in the claims.

In the following Working Examples, the dyes of the following formulae I and II were used:

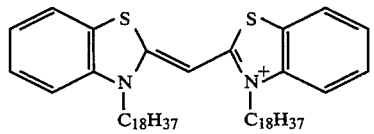

(dye #1)

and

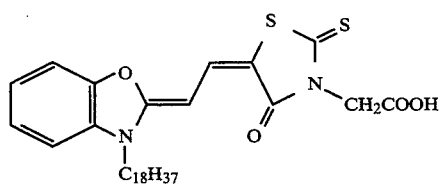

(dye #2).

As the photochromic compounds, those of the following formulae were used:

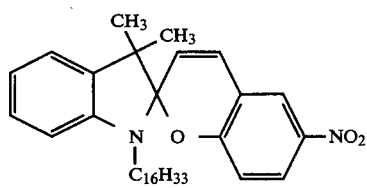

(photochromic compound #5).

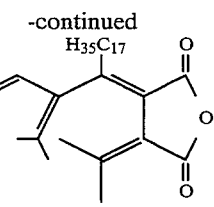

(photochromic compound #1).

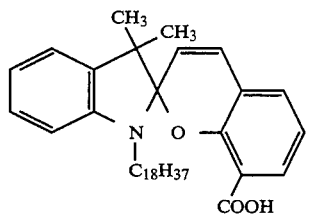

(photochromic compound #2).

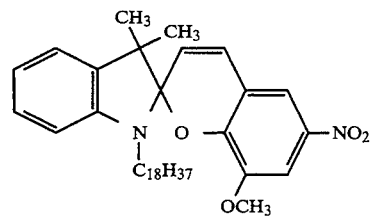

(photochromic compound #3), and

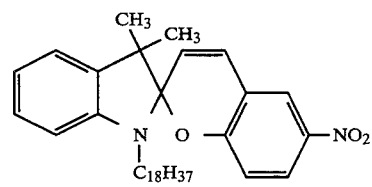

(photochromic compound #4).

As the photoreactive bistable quencher, spiropylane shown in the following structural formula was employed:

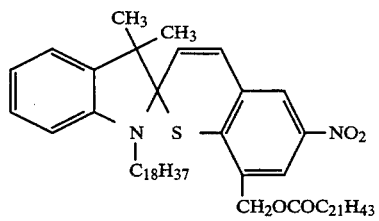

(photo-reactive bistable quencher).

It is needless to say that the dye, photo-reactive bistable quencher and photochromic compound which can be employed for embodying the present invention should not be limited to those compounds mentioned above.

Although quartz and polycarbonate resins were employed in the following Working Examples as the substrate, any of the high molecular weight substance such as acrylic resins and polyolefine resins as well as any of the inorganic substance such as glasses, various metals and $CaF_2$ may also be employed for embodying the present invention.

Further, although a wet method such as a Langumuir Blodgett method (hereinafter, to be referred to simply as LB method) or a spin coating method was employed in forming a recording layer on the substrate in the embodiments, any other film-forming method such as vapor deposition may also be employed. In order to make the formation of a single molecular film in accordance with the LB method (hereinafter, to be referred to as LB film) easy, the compounds having (a) long hydrocarbon chain(s) was(were) utilized. Any of other compounds having no long hydrocarbon chain can however be utilized also for embodying the present invention, If such other film-forming methods are employed.

In the following Working Examples 1–4, an advantage of the present invention in reducing the recording energy is investigated by employing the recording media, each comprising a recording layer composed essentially of a composition which includes a dye and a photochromic compound.

In Working Example 5, another advantage of the present invention in improving the recording density is investigated by employing a plurality of the dyes capable of forming J-aggregates.

In Working Example 6, a further advantage of the present invention in improving the number of cyclic repetition of recording/erasing is investigated by employing an excess amount of the photochromic compound in the composition which includes a dye and a photochromic compound.

In Working Example 7, another advantage of the present invention in improving the durability for the repeated reading is investigated by employing a recording medium comprising a recording layer composed essentially of a composition which includes a photochromic compound and a photo-reactive bistable quencher (which is the second photochromic compound).

WORKING EXAMPLE 1

The above-exemplified photochromic compound #1 and dye #1 (available from Nippon Kanko Shikiso K.K., Japan) were employed in this Working Example. A method for synthesizing the photochromic compound #1 is disclosed in Japanese Unexamined Patent Publication (Tokkaisho) 62-163,991, and thus the quencher was prepared in accordance with this method. A recording layer including the dye #1 and the photochromic compound #1 was formed on a substrate of polycarbonate resin in accordance with a spin-coating method to give a recording medium, wherein a solution prepared by dissolving 0.1 m mol of the dye #1 and 0.02 m mol of the photochromic compound #1 as well as 5.0 g of polyvinyl butylal BL-S (available from Sekisui Kagaku K.K., Japan) in toluene were used.

The initialization was performed by irradiating the thus prepared recording medium with an ultraviolet laser (wavelength: 351 nm; output energy: 20 mJ/cm$^2$), thereby converting the photochromic compound #1 into its colored isomer. Next, the recording of an information was performed by irradiating the initialized recording medium with a visible light laser of wavelength 430 nm, which is in the absorption band of the dye #1, having output energy 280 mJ/cm$^2$. The recording condition was controlled in a manner that the fluorescence intensity of the dye #1 was to vary by 20% at the recording step. The reading of the recorded information was performed by irradiating the recording medium with a visible light laser of wavelength 430 nm, having output energy 1 mJ/cm$^2$, and by detecting a fluorescence of the wavelength 490 nm within the fluorescence band of the dye #1. Further, the recorded information was able to be erased by irradiating the recording medium using the ultraviolet laser of the wavelength of 351 nm.

Another recording layer which does not include the dye #1 was prepared as a Comparison Example. The polycarbonate substrate was coated with a solution prepared by dissolving 0.01 m mol of photochromic compound #1 and 5.0 g of polyvinyl butylal BL-S (available from Sekisui Kagaku k.k., Japan) in toluene in accordance with the spin-coating method under the same conditions as those of Working Example 1 to give a recording medium. The obtained recording medium was initialized in the same manner as that of Working Example 1.

Next, the recording of the information was performed by irradiating the initialized recording medium using a visible light laser of wavelength 540 nm, which is in the absorption maximum of the band of the photochromic compound #1, having output energy 390 mJ/cm$^2$. The reading of the recorded information was performed by irradiating the recording medium with a visible light laser (wavelength: 540 nm; output energy: 1 mJ/cm$^2$) and by detecting the amount of the light transmitted through the photochromic compound #1. The recording condition was controlled in a manner that the amount of the transmitted light was to vary by 20% at the recording step.

As mentioned above, it is confirmed that the recording energy for the recording medium of Working Example 1 (whose recording layer includes a dye) is smaller than that of Comparison Example (whose recording layer does not include a dye) as shown in Table 1.

TABLE 1

|  | Recording energy |
| --- | --- |
| Working Example 1 | 280 mJ/cm$^2$ |
| Comparison Example | 390 mJ/cm$^2$ |

WORKING EXAMPLE 2

In this Working Example, an effect attributable to the difference in the film-forming method was investigated by preparing another recording layer in accordance with the LB method. The above-exemplified photochromic compound #1 (0.02 m mol) and dye #1 (0.01 m mol) as well as stearic acid (1 m mol) were dissolved in chloroform to obtain a solution. The obtained solution was then used to form a recording layer by laminating two single molecular films on the substrate made of quartz plate in accordance with the LB method. The molar ratio of each of the compounds and the manner of the initialization were the same as those in Working Example 1.

Next, the recording of the information was performed by irradiating the initialized recording medium using a visible light laser (wavelength: 430 nm, which is in the absorption band of the dye #1; output energy: 250 mJ/cm$^2$). The recording condition was controlled in a manner that the intensity of the fluorescence by the dye #1 was to vary by 20% at the recording step. The reading of the recorded information was performed by irradiating the recording medium with a visible light laser (wavelength: 430 nm; output energy: 1 mJ/cm$^2$) and by detecting the fluorescence of the wavelength 490 nm emitted by the dye #1. The recording energy at that time was shown in Table 2. Further, the recorded information was able to be erased by irradiating the recording layer with an ultraviolet laser of 351 nm.

TABLE 2

| | Recording energy |
|---|---|
| Working Example 2 | 250 mJ/cm$^2$ |

WORKING EXAMPLE 3

The above-exemplified dye #1 and photochromic compound #2 (available from Nippon Kanko Shikiso K.K., Japan) were employed in this Working Example. A recording layer composed of two laminated single molecular films was formed on a substrate made of quartz plate in accordance with the LB method to give a recording medium. In the forming a solution prepared by dissolving 0.2 m mol of the dye #1 and 0.03 m mol of the photochromic compound #2 as well as 2 m mol of stearic acid in chloroform was used. The photochromic compound #2 was in its colored isomer at the time of the preparation and thus was in its already initialized state.

Next, as in the same manner as that in Working Example 1, the recording was performed by irradiating the initialized recording medium using a visible light laser (wavelength: 430 nm, which is in the absorption band of the dye #1, output energy: 190 mJ/cm$^2$). The recording condition was controlled in a manner that the intensity of the fluorescence emitted by the dye was to vary by 20% at the recording step. The reading of the recorded information was performed by irradiating the recording medium with a visible light laser (wavelength: 430 nm; output energy: 1 mJ/cm$^2$) and by detecting a fluorescence of the wavelength: 490 nm within the fluorescence band of the dye #1. The recording energy was shown in Table 3 below. Further, the recorded information was able to be erased by irradiating the recording medium using the ultraviolet laser of the wavelength: 351 nm.

Another recording layer which does not include the dye #1 was prepared as a Comparison Example. The quartz plate substrate was coated with a recording layer composed of ten (10) single molecular films by applying a solution prepared by dissolving 0.03 m mol of photochromic compound #2 and 2 m mol of stearic acid in chloroform in accordance with the LB method under the same conditions as those of Working Example 1 to give an optical recording medium.

Next, the recording of the information was performed by irradiating the initialized recording medium using a visible light laser (wavelength: 470 nm, being in the maximum absorption band of the photochromic compound #2; output energy: 300 mJ/cm$^2$). The reading of the recorded information was performed by irradiating the recording medium with a visible light laser (wavelength: 470 nm; output energy: 1 mJ/cm$^2$) and by detecting the fluorescence at 660 nm within the fluorescence band of the photochromic compound #2. The recording condition was controlled in a manner that the intensity in the fluorescence was to vary by 20% at the recording step.

The comparison of the recording energies was shown in Table 3. As indicated in Table 3, it is proved that the recording energy for the recording medium of Working Example 3 is smaller than that of Comparison Example.

TABLE 3

| | Recording energy |
|---|---|
| Working Example 3 | 190 mJ/cm$^2$ |
| Comparison Example | 300 mJ/cm$^2$ |

WORKING EXAMPLE 4

In this Working Example, the effect of the J-aggregate, which may be produced from the dye, on the recording energy was investigated. The above-exemplified dye #2 (available from Nippon Kanko Shikiso K.K., Japan) and photochromic compound #3 were employed in this Working Example. A recording layer composed of two laminated single molecular films was formed on a substrate made of quartz plate in accordance with the LB method to give a recording medium. In the forming, a solution prepared by dissolving 0.5 m mol of the dye #1 and 1.5 m mol of hexadecane in chloroform and another solution prepared by dissolving 0.002 m mol of the photochromic compound #3 and 0.5 m mol of stearic acid in chloroform were used respectively for laminating each of the above mentioned single molecular films. At this laminating step, by making a subphase of the solution of an aqueous solution of cadmium chloride, the stearic acid was deposited as cadmium stearate in the film. The photochromic compound #3 was in its colored isomer at the time of the preparation and thus in its already initialized state. In the obtained recording medium, the dye #2 formed a J-aggregate, whose wavelength in the absorption maximum was 540 nm and whose wavelength in the fluorescence was 560 nm.

Next, the recording of the information was performed by irradiating the initialized recording medium with a visible light laser (wavelength: 540 nm, which is in the absorption band of the dye #2; output energy: 60 mJ/cm$^2$). The recording condition was controlled in a manner that the intensity of the fluorescence emitted by the photochromic compound #3 was to vary by 20% at the recording step. The reading of the recorded information was performed by irradiating the recording medium with a visible light laser (wavelength: 540 nm; output energy: 1 mJ/cm$^2$) thereby to detect a fluorescence of the wavelength: 680 nm within the fluorescence band of the photochromic compound #3. Further, the recorded information was able to be erased by irradiating the recording medium using the ultraviolet laser of the wavelength: 351 nm.

Another recording medium which does not include the dye #2 was prepared as a Comparison Example. The quartz plate substrate was coated with a recording layer composed of twenty (20) single molecular films by applying the chloroform solution prepared in accordance with Working Example 4 including only the photochromic compound #3 and stearic acid on the quartz plate substrate in accordance with the LB method to give another optical recording medium. As the subphase, an aqueous solution of cadmium chloride was used. The photochromic compound #3 was in its colored isomer at the time of the preparation and thus in its already initialized state.

Next, the recording of the information was performed by irradiating this recording medium with a visible light laser (wavelength: 590 nm, which is in the wavelength of the absorption maximum of the photochromic compound #3; output energy: 350 mJ/cm$^2$). The recorded information was read by irradiating the recording medium with a visible light laser (wavelength: 590 nm; output energy: 1 mJ/cm$^2$) and by detecting the fluorescence at 580 nm within the wavelength of the fluorescence band of the photochromic compound #3. The recording condition was controlled in a manner that the intensity in the fluorescence was to vary by 20% at the recording step. The value of the recording energy consumed for the recording media of Working Example 4 and that of Comparison Example were shown in Table 4, below.

TABLE 4

|  | Recording energy |
|---|---|
| Working Example 4 | 60 mJ/cm$^2$ |
| Comparison Example | 350 mJ/cm$^2$ |

As indicated above, it is proved that the the recording energy for the recording medium is reduced prominently by making the dye to form a J-aggregate, because the efficiency in the energy transfer from the dye to the photochromic compound is increased by the J-aggregate.

Further, for comparing the various manners of the reading the recorded information, another recording was performed by irradiating the same recording medium as that of Working Example 4, using a visible light laser (wavelength: 540 nm, which is in the absorption band of the dye #2; output energy: 60 mJ/cm$^2$). The recorded information was read by irradiating the recording medium with a visible light laser (wavelength: 540 nm; output energy: 1 mJ/cm$^2$) and by detecting a fluorescence of the wavelength: 560 nm within the fluorescence band of the dye #2. At this time, the variance in the intensity of the fluorescence at the recording step was found to be 15%, being smaller than 20% at that of Working Example 4.

As above-mentioned, it is confirmed that according to the manner of reading by detecting the fluorescence emitted from the photo-reactive quencher as in Working Example 4, in the case wherein the wavelength difference between the absorption wavelength and the fluorescence wavelength is small, a more favorable reading can be performed than by detecting the fluorescence emitted from the dye. This is because the variance of the fluorescence intensity at the recording step is larger in the former.

WORKING EXAMPLE 5

In this Working Example, a multi-frequency recording was performed by employing a plurality of the dyes, each of which is capable of forming a J-aggregate. The above-exemplified photochromic compounds #1 and #3, and dyes #1 and #2 were employed in this Working Example. A first recording layer of two single molecular films including the dye #1 and the photochromic compound #1 was formed on the quartz substrate plate in accordance with the LB method. On the first recording layer, a separation layer composed of forty (40) single molecular films including cadmium stearate was laminated. Further, a second recording layer of two single molecular films including the dye #2 and the photochromic compound #3 was laminated on the separation layer to complete the recording medium. In order to form the first recording layer, a solution prepared by dissolving 0.1 m mol of the dye #1, 0.005 m mol of the photochromic compound #1 and 0.1 m mol of arachinic acid in chloroform was employed. In order to form the second recording layer, a solution prepared by dissolving 0.5 m mol of the dye #2, 0.02 m mol of the photochromic compound #3 and 1.5 m mol of hexadecane in chloroform was employed. The dyes produced the J-aggregates, respectively in the recording medium, and the wavelength of the absorption maxima of the dye #1 proved to be in 450 nm and 470 nm, and those of the dye #2 proved to be in 540 nm and 560 nm, respectively.

The initialization of the thus prepared recording medium was made by irradiating it with an ultraviolet laser (wavelength: 351 nm, which is in the absorption wavelength of the photochromic compound #1; and output energy: 10 mJ/cm$^2$), whereby the photochromic compound #1 was converted into its colored isomer. On the other hand, the photochromic compound #3 had already been in its colored isomer and in the initialized state, immediately after the lamination.

Then, a recording was performed by irradiating the initialized recording medium with a visible light laser (wavelength: 450 nm of the wavelength which is selectively absorbed by the dye #1; and output energy: 10 mJ/cm$^2$) to achieve a RECORDED STATE #1 on the recording layer. Then, a multiplied recording was performed by irradiating the recording medium with a visible light laser (wavelength: 540 nm of the wavelength which is selectively absorbed by the dye #2; output energy: 100 mJ/cm$^2$) to achieve a RECORDED STATE #2 on the recording layer at the same spot. Thereafter, another recording was performed by irradiating the initialized recording medium using a visible light laser (wavelength: 450 nm of the wavelength which is selectively absorbed by the dye #1; output energy: 180 mJ/cm$^2$) to achieve a RECORDED STATE #3 at the different spot on the recording layer.

The reading of the recorded information was performed by irradiating the recording medium with a visible light laser (wavelength: 450 nm; output energy: 1 mJ/cm$^2$) and by detecting a fluorescence of the wavelength: 490 nm of the dye #1, by irradiating it with a visible light laser (wavelength: 540 nm; output energy: 1 mJ/cm$^2$) and by detecting a fluorescence of the wavelength: 680 nm of the photochromic compound #3.

The results of the above-mentioned recording/reading experiments are summarized in Table 5 below, wherein the fluorescence intensities at the respective reading steps are the relative values, which are obtained by providing that the intensities at the wavelengths of 490 nm and 680 nm in the initial state are 1, respectively.

As shown in Table 5, it is appreciated that the selective recordings have been performed on the recording medium with each of the wavelengths of the recording irradiations. In this manner, a two-wavelength multiplied recording was made possible. The recorded state of information was able to be erased by irradiating the recording medium with an ultraviolet laser of wavelength: 351 nm.

TABLE 5

|  | Fluorescence Intensity Detected at Reading Step | |
|---|---|---|
|  | 490 nm | 680 nm |
| Initial State | 1.00 | 1.00 |
| Recorded State #1 | 1.20 | 0.94 |
| Recorded State #2 | 1.26 | 0.80 |

TABLE 5-continued

| | Fluorescence Intensity Detected at Reading Step | |
|---|---|---|
| | 490 nm | 680 nm |
| Recorded State #3 | 1.07 | 0.80 |

As above-mentioned, a multiplied recording is made possible by forming two recording layers, each including a dye different with each other, on the recording medium. Instead of employing the conventional method for using a photochromic compound capable of forming a J-aggregate, it should be particularly remarked that a multiplied recording of a high wavelength selectivity can be possible by employing a dye capable of forming a J-aggregate in accordance with the present invention.

Further, although the photochromic compound of spiropilanes having a long hydrocarbon chain of 18 carbon atoms was employed in the foregoing Working Examples 4 and 5, those having a long hydrocarbon chain of 11 or of 31 carbon atoms were proved to give a favorable LB film and the same advantage was obtained.

WORKING EXAMPLE 6

In this Working Example, the effect of the above-stated measure on the stability (number of possible repetition of the recording and erasing) was examined on an optical recording medium. The object optical recording medium was prepared by incorporating an excess amount of the photochromic compound for the amount actually required for quenching the fluorescence emitted by the dye (wherein the recorded information is erased by converting a minute portion of the photochromic compound into its colored isomer at the erasing step). The above-exemplified dye #2 and photochromic compound #4 were employed in this Working Example.

A solution prepared by dissolving 0.5 m mol of the dye #2 and 1.5 m mol of hexadecane in chloroform and another solution prepared by dissolving 0.5 m mol of the photochromic compound #4 and 1.5 m mol of stearic acid in chloroform were used to form the optical recording layer. In the forming of the optical recording layer, a single molecular film containing the dye #2 was first formed on a quartz plate substrate and another single molecular film containing the photochromic compound #4 was laminated on the first-mentioned film in accordance with the LB method. In the recording medium thus formed, the dye #2 formed a J-aggregate, whose absorption maximum was in the wavelength: 540 nm and whose fluorescence maximum was in the wavelength: 560 nm. The photochromic compound #4 was in its colorless isomer and being inactive as a quencher in the recording medium as prepared.

The initialization was performed by irradiating the recording medium with a laser beam (wavelength: 351 nm; output: 0.3 mJ), thereby converting a portion of the photochromic compound #4 into its colored isomer (the activated state as a quencher). Next, the recording of the information was performed by irradiating the initialized recording medium with a laser beam (wavelength: 540 nm, which is in the absorption maximum wavelength; energy output: 90 mJ/cm$^2$). The recording energy was set in a manner that the fluorescence intensity at 560 nm was to vary by 20%.

The erasing of the recorded information was achieved by irradiating the recording medium with a laser beam at 351 nm. The condition of the erasing was set in a manner that the fluorescence intensity was to decrease by 20% at this step. Further, it was confirmed that the change in the fluorescent intensity at the recording/erasing was able to be kept to 20%, which was the same value as that initially set, even after the 200 repetitions of the recording and erasing operations.

Thus as above-mentioned, a recording medium containing an excess amount of the photochromic compound is employed, so that the proportion of the photochromic compound, which is activated at the time of erasing operation against the total amount, is decreased. Thereby, the amount of actual deterioration at each recording/erasing cycle is decreased, and thereby the recording/erasing cycle life characteristics of the recording medium was improved. Simultaneously with this improvement, the energy required for the erasing operation was also able to be reduced.

For comparison, the effect of another recording medium on the recording/erasing repetition was also investigated by changing major portion of the photochromic compound to its colored isomer, thus activating it as a quencher at the erasing step. The initialization (erasing) was performed on the same recording medium as that of Working Example 6 by irradiating it with an ultraviolet laser (wavelength: 351 nm; energy output: 50 mJ/cm$^2$). The recording of the information was performed by irradiating the initialized recording medium with a laser beam (wavelength: 540 nm, which is in the absorption maximum of the dye; energy output: 250 mJ/cm$^2$). The recording energy was determined in a manner that the fluorescence intensity at 560 nm was to vary by 20% at the recording step. And it was confirmed that the change in the fluorescent intensity at the recording/erasing of this comparison sample became under 20% (which is the same value as the initially set state), only after 20 repetitions in the course of repetitions of the 50 recording/erasings, and further repetition of the recording and erasing was found to be difficult.

WORKING EXAMPLE 7

In this Working Example, in order to investigate the effect of such combination on the repeated reading, a repeated reading experiment was performed on an optical recording medium, which comprises a recording layer composed essentially of a composition which includes a photochromic compound with a fluorescent activity (, which is a first photochromic compound,) and a photo-reactive bistable quencher (, which is a second photochromic compound,).

The above-exemplified photochromic compound #5 having a fluorescent activity as a photochromic compound ( . . . a first photochromic compound . . . ) and photo-reactive bistable quencher of the chemical expression of page 29 as a photoreactive bistable quencher ( . . . a second photochromic compound . . . ) were employed in this Working Example. Both the colorless isomer of the photochromic compound #5 and the long wavelength isomer of the photo-reactive bistable quencher are compounds which emit only scarce fluorescence. The employed photochromic compound #5 is available from the Nihon Kanko Shikiso K.K., Japan, and the photo-reactive bistable quencher is synthesized in accordance with the method disclosed in Japanese Patent Application (Tokuganhei) 2-273,939 published under No. 4-146,989 on May 20, 1992. A chloroform solution containing the photochromic compound #5, the photoreactive bistable quencher and poly-dioctadecyldimethylammonium stylenesulfonate as a polymeric substance for carrying these compounds, in a ratio by weight of 1:0.2:20, was prepared and the obtained solution was used to form a recording layer on a quartz plate substrate by spin coating to obtain a recording medium. In the obtained recording medium, the photochromic compound #5 was in its colorless isomer, which corresponds to the recorded state. Further, the photo-reactive bistable quencher was in its short wavelength isomer, which was in an inactivated state as a quencher.

Since an initialization of the recording layer was required to be performed before recording, the following erasing operation was first performed on the prepared recording medium. The erasing was performed by irradiating the recording medium with a laser beam (wavelength: 380 nm; energy output: 20 mJ), whereby converting the photo-reactive bistable quencher into its long wavelength isomer and then by irradiating the recording medium with an ultraviolet laser beam (wavelength: 340 nm, energy output: 10 mJ), thereby converting the photochromic compound #5 into its colored isomer.

Next, the recording of the information was performed, by irradiating the erased recording medium with a visible laser beam (wavelength: 680 nm; energy output: 800 mJ/cm$^2$), whereby converting the photoreactive bistable quencher into its short wavelength isomer, and then by irradiating the erased recording medium with a visible laser beam (wavelength: 540 nm; energy output: 240 mJ/cm$^2$). Thereby the photochromic compound #5 is converted into its colorless isomer. The recording energy was controlled in a manner that the variation of lights transmitted through the recording layer between the recorded spot and the non-recorded spot was to be 10% of the total light transmitted through the recording layer at the non-recorded spots. The recorded information was read by irradiating the recording medium with a visible laser beam (wavelength: 540 nm; energy output: 1 mJ) and by detecting the transmitted light. The readings of 430 repetition were possible until such a state that the light transmitted through the non-recorded spot became indiscernible with that through the recorded spot.

As a first Comparison Example, another initialization was performed on the same recording medium as that of Working Example 7 by using the conventional erasing method. The erased state was brought to the recording medium by irradiating it with an ultraviolet laser beam (wavelength: 340 nm; energy output: 10 mJ/cm$^2$), thereby converting the photochromic compound into its colored isomer. In this process, the density of the colored isomer produced during the erasing operation was reduced by 10% as compared with such a case that the photo-reactive bistable quencher was activated by irradiating it with the ultraviolet laser of 380 nm as in Working Example 7. As a result, after being recorded in the same method as that of Working Example 7, the difference detected for reading the recorded information in the transmitted light between the recorded spot and the non-recorded spot was decreased, accordingly. And thus a reduction in the SN ratio at the reading step and a decrease in the reading accuracy were brought.

As a second Comparison Example, another experiment was performed, wherein information was recorded on the recording medium, which had been produced and initialized in the same erasing method as that of Working Example 7, in accordance with the conventional recording method. Next, the photochromic compound contained in the recording layer was converted into its colorless isomer by irradiating the recording medium with a visible laser beam (wavelength: 540 nm, energy output: 240 mJ/cm$^2$). However, the difference in the transmitted light between the recorded spot and the non-recorded spot detected at the reading step was too small to be recognized as a recorded state. This is attributable to the fact that, since the photo-reactive bistable quencher is in its long wavelength isomer, the energy transfer from the photochromic compound #5 to the photo-reactive bistable quencher was proceeded, and thus the photochromic reaction for converting the colored isomer of the photochromic compound #5 into its colorless isomer was not proceeded sufficiently.

As a third Comparison Example, a reading in accordance with the conventional reading method was performed on a recording medium which did not include the photo-reactive quencher and had been initialized and recorded in accordance with the conventional erasing and recording methods.

A chloroform solution containing the above-exemplified photochromic compound #5 and poly-dioctadecyldimethylammonium stylenesulfonate in a ratio by weight of 1:20 was prepared, and the obtained solution was used to form a recording layer on a quartz plate substrate by the spin coating to obtain a recording medium. An erasing was performed by irradiating the recording medium with a laser beam of 340 nm, thereby converting the photochromic compound #5 in its colorless isomer into its colored isomer.

Next the recording of the information on the Comparison Examples was performed by irradiating the erased recording medium with a visible laser beam (wavelength: 540 nm, energy output: 240 mJ/cm$^2$), thereby converting the photochromic compound into its colorless isomer. The recorded information was read by irradiating the recording medium with a visible laser beam (wavelength: 540 nm, energy output: 1 mJ) and by detecting the transmitted light. The readings of 205 repetitions were possible until such state that the light transmitted through the non-recorded spot became indiscernible with that through the recorded spot. As above-mentioned, the destruction of the recorded state at the reading step (read-out destruction) was proceeded as compared with Working Example 7, and the possible reading repetitions were decreased.

As previously described, according to the Working Example 7, a recording in favorable sensitivity is made possible by using a recording medium comprising a recording layer composed essentially of the composition which includes a photochromic compound and a photo-reactive bistable quencher. This can be made by performing a recording after inactivating the photo-reactive bistable quencher and by performing a reading after activating the photo-reactive bistable quencher. And thus the reading repetitions were increased by reducing the destruction of the recorded information at the reading step. Further, by erasing the recorded information after activating the photo-reactive bistable quencher and thus by raising the density of the colored isomer in the photochromic compound, a reading of a high precision was made possible.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. In an optical recording medium comprising at least one recording layer containing as essential material a composition which includes
   at least one dye and
   at least one photochromic compound,
   the improvement that
   said dye is a fluorescent material,
   said photochromic compound is a photo-reactive bistable quencher for quenching the fluorescence emitted from said fluorescent material, and
   amount of said photo-reactive bistable quencher is in excess for the amount actually required for quenching said fluorescence.

2. A method for erasing information stored in or for initializing an optical recording medium comprising at least one recording layer containing as essential material a composition which includes
   at least one dye and
   at least one photochromic compound,
   the improvement that
   said dye is a fluorescent material.
   said photochromic compound is a photo-reactive bistable quencher for quenching the fluorescence emitted from said fluorescent material, and
   amount of said photo-reactive bistable quencher is in excess for the amount actually required for quenching said fluorescence,
   which method comprises:
      irradiating said recording layer with a light at the wavelength in an absorption band of a colorless isomer of said photochromic compound, and thereby
      converting a portion of said first photochromic compound into its colored isomer.

3. A method for erasing information stored in or for initializing an optical recording medium comprising at least one recording layer containing as essential material a composition which includes
   at least a first photochromic compound with fluorescent activity and takes either one of two states of colorless isomer and of colored isomer, and
   at least one photo-reactive bistable quencher, which is also a second photochromic compound, takes either one of two states of long wavelength isomer and of short wavelength isomer and quenches the fluorescence emitted from said first photochromic compound,
   said one photo-reactive bistable quencher being a control agent for controlling the photochromic reactivity of said photochromic compound,
   which method comprises:
      irradiating said recording medium with a light at the wavelength in an absorption band of a short wavelength isomer of said photo-reactive bistable quencher included in said recording layer thereby converting said photo-reactive bistable quencher into its long wavelength isomer and activating it as a quencher, and then
      irradiating said recording layer with a light at the wavelength in an absorption band of said colorless isomer of said first photochromic compound included in said recording layer thereby converting said colorless isomer of said first photochromic compound into its colored isomer.

4. A method for recording information on an optical recording medium comprising at least one recording layer containing as essential material a composition which includes
   at least a first photochromic compound with fluorescent activity and takes either one of two states of colorless isomer and of colored isomer, and
   at least one photo-reactive bistable quencher, which is also a second photochromic compound, takes either one of two states of long wavelength isomer and of short wavelength isomer and quenches the fluorescence emitted from said first photochromic compound,
   said one photo-reactive bistable quencher being a control agent for controlling the photochromic reactivity of said photochromic compound,
   which recording medium has previously been erased or initialized by irradiating said recording medium with a light at the wavelength in an absorption band of a short wavelength isomer of said photo-reactive bistable quencher included in said recording layer thereby converting said photo-reactive bistable quencher into its long wavelength isomer and activating it as a quencher, and then by irradiating said recording layer with a light at the wavelength of an absorption band of said colorless isomer of said first photochromic compound included in said recording layer thereby converting said colorless isomer of said first photochromic compound into its colored isomer,
   which method comprises:
      irradiating a light at the wavelength in an absorption band of a long wavelength isomer of said photo-reactive bistable quencher thereby inactivating it as a quencher by converting said photo-reactive bistable quencher into its short wavelength isomer, and then
      irradiating said recording layer with a light the wavelength in an absorption band of the colored isomer of said first photochromic compound thereby converting said first photochromic compound into its colorless isomer.

* * * * *